3,458,829
APPARATUS FOR CONTROLLING THE AREA
OF EMISSION OF LASER LIGHT
Robert V. Pole, Yorktown Heights, and Euval S. Barrekette, New York, N.Y., assignors to International Business Machines Corporation, Armonk, N.Y., a corporation of New York
Filed Nov. 25, 1964, Ser. No. 413,703
Int. Cl. H01s 3/00; G02f 1/34
U.S. Cl. 331—94.5                    5 Claims

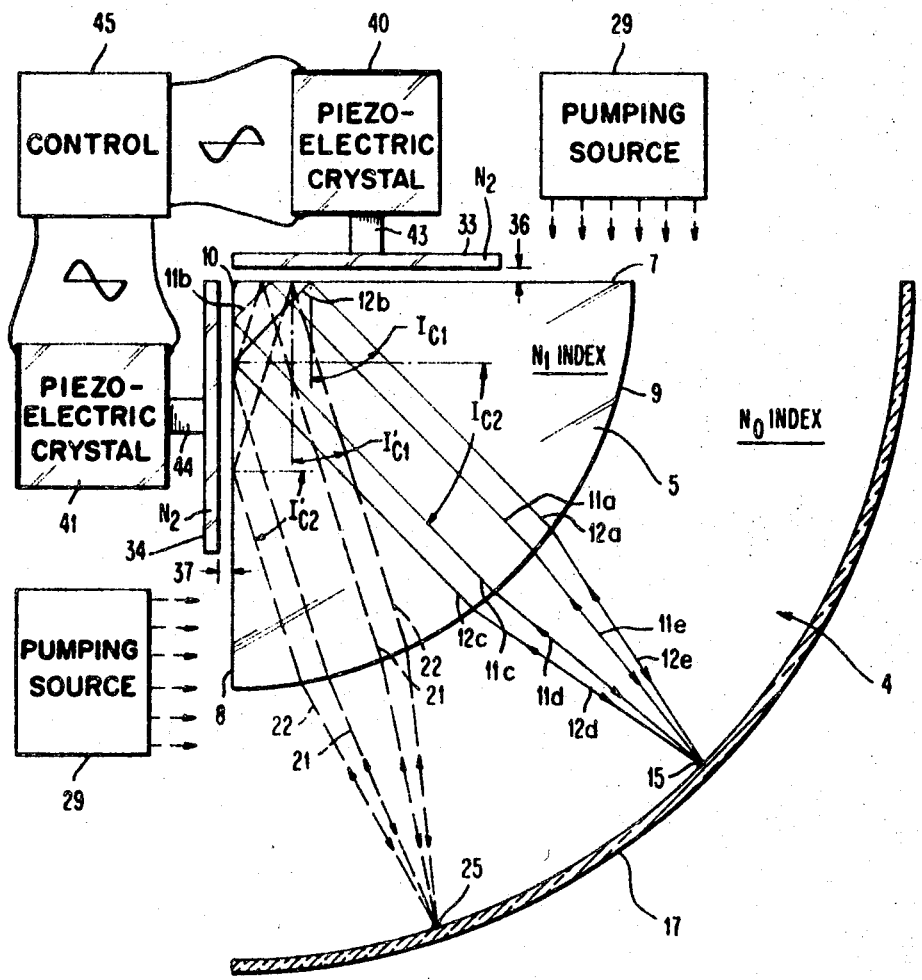

ABSTRACT OF THE DISCLOSURE

The active laser element is a cylinder having a cross-section of a 90° sector of a circle. The radial surfaces of the element act as internally reflecting surfaces while the circumferential surface functions as a lens for focusing the light from the radial surfaces upon a conjugate surface, the conjugate surface being circular and concentric with the circumferential surface of the laser. A mirror is provided in the conjugate surface so that light focused by the action of the lens is reflected by the mirror back upon the internally reflecting surfaces of the laser. The light returned to the laser from any point on the mirror is reflected by the two radial surfaces back to the same point on the mirror whereby a plurality of resonant paths are created. Control of the area of laser light emission is achieved by frustrating the internal reflection of the surface or by inserting light limiting devices between the laser and the mirror.

---

This invention relates to apparatus for controlling the emission of laser light, and more particularly to apparatus which controls the direction of a laser beam.

Various methods have been used to control the direction of laser light, including rotating mirrors, prisms and birefringent crystals which deflect laser beams passing therethrough. All of these devices change the direction of the laser light after it has been emitted.

Another technique for controlling laser beams is disclosed in commonly assigned, co-pending application Ser. No. 332,617 entitled, "Scanning Laser," by R. V. Pole, application Ser. No. 377,957 entitled, "Laser Beam Switching," by R. V. Pole et al., application Ser. No. 378,220 entitled, "Laser Beam Switching" by R. V. Pole et al. application Ser. No. 412,814 entitled, "Apparatus for Controlling a Laser Beam," by R. V. Pole et al. In these devices the emission of the laser is controlled so that the laser light is emitted only in a selected direction, as opposed to altering the direction of the beam after it has been emitted by the laser. The present invention uses the same technique, but employs a different phenomenon to control the direction of emission, and also differs from the above applications in the shape of the laser cavity in which emission is controlled.

Commonly assigned, concurrently filed application Ser. No. 413,704, entitled, "Laser Emission Control Apparatus," by R. V. Pole employs the same phenomenon as the present invention. However the cavity geometry of the present invention differs so that certain advantages enumerated hereinafter are achieved.

It is an object of the present invention to provide an improved apparatus for directing the area of the emission of a laser beam.

It is another object of the present invention to provide simple apparatus which can be constructed and aligned easily for directing the area of emission of a laser beam.

Still another object of the present invention is to provide apparatus which controls the direction of a laser beam having a narrow width.

A further object of the present invention is to provide a laser cavity having a new and improved shape.

These and other objects of the present invention are accomplished by providing an active laser element having two perpendicular surfaces each of which internally reflects light striking the surface at an angle of incidence greater than a certain critical angle of incidence. A resonant cavity is formed by placing a mirror about the laser. The light internally reflected from the two surfaces is reflected by the mirror back along the same path setting up a plurality of resonant paths each having different angles of incidence on the surfaces. Light striking the laser surfaces an angles less than the respective critical angles is transmitted through the surface, instead of being internally reflected to form a resonant path.

The critical angle of incidence may be adjusted by "frustrating" the internal reflection. The phenomenon of frustrated total internal reflection is described in an article by I. N. Court and F. K. von Willisen, entitled, "Frustrated Total Internal Reflection and Application of Its Principle to Laser Cavity Design" published in Applied Optics, June 1964, vol. 3, No. 6. In accordance with the present invention a transparent member is placed near at least one of the two laser surfaces. By adjusting the gap between the member and surface the critical angle of incidence is correspondingly adjusted. The emission of laser light is limited to a sector defined on one side by the critical angle of indicence of one surface and on the other side by the critical angle of incidence of the remaining surface. Therefore the width of the area of emission and the direction can be controlled by controlling the critical angles of incidence for the two laser surfaces.

An advantage of the present invention is the small motion of the transparent member that is required in order to rapidly adjust the direction of emission.

A further advantage of the present invention is the simple construction of the cavity which requires no polarizing components or other specialized optical apparatus.

Still another advantage of the present invention is the ability to control the direction of emission of the laser beam through a continuous swing approaching 90°.

In accordance with another aspect of the present invention the active laser element is formed with a cross-section in the shape of a 90° sector of a circle. The two flat portions act as the internally reflecting surfaces, while the circular portion acts as a lens focusing light reflected from the surfaces upon a conjugate surface. The conjugate surface is circular and concentric with the rounded portion of the laser.

A mirror is located in the conjugate surface so that light focused by the lens action of the lens is reflected by the mirror back upon the internally reflecting surfaces of the laser. The light returned to the laser from any point on the mirror is reflected by the two surfaces of the laser back to the same point on the mirror. In this manner a plurality of resonant paths are set up. Control of the area of emission of laser light can be achieved by frustrating the internal reflection of the surface as described above, or by inserting light limiting devices between the laser and mirror such as those shown in the above co-pending applications.

The cavity includes only a single mirror and is relatively easy to construct and align.

Another advantage is the accessability of the point of symmetry of the cavity where various light absorbing objects can be inserted to block certain resonant paths in accordance with some preferred pattern of emission.

The foregoing and other objects, features and advantages of the invention will be apparent from the following more particular desciption of a preferred embodiment of the invention, as illustrated in the accompanying drawing in which a side view of the preferred embodiment of the present invention is shown.

A laser cavity 4 is shown in the drawing capable of directing the emission of a laser beam with a wide angular variation approaching 90°. A laser 5 is formed with a cross-section in the shape of a 90° circular sector. The three dimensional, or solid, geometry of the laser 5 is a quarter-section of a cylinder in the preferred embodiment.

Laser 5 includes a pair of surfaces 7 and 8 and a 90° circular portion 9 centered on a point 10. The laser 5 is composed of any active material, typically ruby but may also be a junction injection laser, having an index of refraction $N_1$ greater than the index of refraction $N_0$ in the surrounding medium. Due to the change in index of refraction at surfaces 7 and 8 light approaching them from within laser 5 is internally-reflected for certain angles of incidence. The angle of incidence is defined as the angle between a ray striking a surface and a line perpendicular to the surface. The smallest angle of incidence for which internal reflection occurs is referred to herein as the critical angle of incidence.

A group of rays 11 and 12 is used to illustrate the manner in which a resonant path is set up within the cavity 4. Ray 12a strikes surface 7 at an angle of incidence $I_{c1}$ equal to 45°. The ray 12a is internally reflected from surface 7 and is designated 12b. The ray 12b strikes surface 8 at an angle of incidence $I_{c2}$ equal to 45°. The portion of ray 12 reflected from surface 8 is designated 12c.

The ray 12c leaves surface 9 and is refracted by the lens action of surface 9. The refracted ray is designated 12d in the drawing.

The ray 11 follows a path parallel to the portions of ray 12 designated 12a–12c, similar portions of ray 11 being designated with like letter a–c. As the ray 11c leaves surface 9 it is refracted as illustrated by the ray 11d. The lens action of surface 9 causes rays 11d and 12d to converge at a point 15.

A 90° circular mirror 17 having a three dimensional shape in the form of a cylinder is located at point 15 causing the rays 11d and 12d to be reflected as illustrated by rays 11e and 12e, respectively. The rays 11e and 12e link up with rays 11a and 12a, respectively forming a complete loop. While the above description follows a counterclockwise sequence, the resonant energy includes components traveling in both directions, setting up a standing wave. Another pair of rays 21 and 22 illustrates the manner in which another resonant path is set up in the cavity 4. Rays 21 and 22 strike surface 7 at angles of incidence equal to $I'_{c1}$, and strike surface 8 at an angle of incidence equal to $I'_{c2}$. The lens action of surface 9 causes the rays 21 and 22 to be converged at a point 25 lying on the reflective surface of mirror 17.

In this manner a plurality of reconant paths, two of which are illustrated by rays 11 and 12, and rays 21 and 22, are set up within the cavity 4. The cavity is angularly degenerate because it includes a number of paths, or modes of oscillation having various angular orientations. As long as the rays are reflected by the surfaces 7 and 8 rather than being transmitted therethrough, the resonant paths can be set up at any or all angles about the point 10 within the 90° sector of the mirror 17 and laser 5.

When the laser 5 is pumped (either optically if laser 5 is made of a ruby material or electrically if laser 5 is an injection laser) by a suitable pumping source 29, the laser 5 emits light along all paths reflected by the surfaces 7 and 8. Various methods may be employed for limiting the intensity of light and therefor suppressing the emission of laser light along certain of the paths. Several examples are shown in the above co-pending applications. Kerr cells (not shown) may be located in the region between surface 9 and mirror 17 to block a portion of the light reflected from mirror 17. In accordance with another aspect of the present invention, the area of emission can be restricted to a very narrow beam path by varying the critical angles of incidence at the surfaces 7 and 8. For example if the critical angle of incidence for both surfaces 7 and 8 is 45° as illustrated by the angles $I_{c1}$ and $I_{c2}$, then only rays parallel to rays 11 and 12 within laser 5 are reflected from the surfaces 7 and 8 and focused at point 15. All other rays are transmitted through either surface 7 or surface 8 and do not return to mirror 17 thereby limiting the emission of laser light to the single point 15.

To illustrate the manner in which rays are transmitted through surfaces 7 and 8, assume that a ray strikes surface 7 at an angle of incidence equal to 46°. Since this angle of incidence is greater than the critical angle of incidence $I_{c1}$ (45°) the ray is internally reflected from surface 7. However the assumed ray strikes surface 8 at an angle of incidence equal to 44° which is less than the critical angle of incidence $I_{c2}$ (45°) and is therefore transmitted through surface 8. Accordingly no resonant path is set up for rays striking surface 7 at an angle of incidence greater than 45°. Rays striking surface 7 at angles of incidence of less than 45° are transmitted directly through surface 7 since the critical angle of incidence $I_{c1}$ is 45°. Therefore only rays striking surfaces 7 and 8 at 45° are reflected by both surfaces 7 and 8 and focused at point 15.

Laser emission can be limited to other resonant paths focused at other points, for example point 25, on mirror 17. To select point 25, the critical angle of incidence of surface 7 is altered to approximately 20° as illustrated in the drawing by the angle $I'_{c1}$. Such small critical angles of incidence may not be attainable in certain active laser materials. However this angle is used herein to illustrate the operation of the cavity illustrated in the drawing. The critical angle of incidence of surface 8 is altered to 80° as indicated by angle $I'_{c2}$. Rays striking surface 7 at angles less than $I'_{c1}$ are transmitted through surface 7, while rays striking surface 7 at angles of incidence greater than $I'_{c1}$ are reflected by surface 7, but the latter are transmitted through surface 8 since they strike surface 8 at angles of incidence less than $I'_{c2}$. Therefore only rays 21 and 22 and all rays parallel thereto within laser 5 are reflected by both surfaces 7 and 8 and are focused at point 25.

One method of adjusting the critical angles of incidence of surfaces 7 and 8 is illustrated in the drawing. This method "frustrates" the internal reflection of light causing it to be transmitted through the surface instead of being internally reflected. A pair of transparent members 33 and 34 each having an index of refraction $N_2$ greater than $N_1$ are located adjacent to surfaces 7 and 8 respectively. A pair of gaps 36 and 37 are formed in the order of a wavelength of the laser light. As the gaps 36 and 37 are reduced, light striking surfaces 7 and 8 at certain angles of incidence "tunnels" through the gaps 36 and 37 into the adjacent member 33 or 34, thereby frustrating the internal reflection of this light.

The size of the gaps 36 and 37 can be adjusted by coupling members 33 and 34 to a pair of piezoelectric crystals 40 and 41 by a link 43 and 44, respectively. In accordance with the conventional operation of a piezoelectric crystal a field is impressed upon the crystals 40 and 41 by a control device 45 producing mechanical expansion or contraction of the crystals 40 and 41 resulting in a corresponding expansion or contraction of the gaps 36 and 37 respectively.

In the preferred operation of the present invention the control device 45 provides signals to crystals 40 and 41 which are 180° out of phase. Therefore as the critical index of refraction for surface 7 is increased, the critical index of refraction for surface 8 is decreased and vice versa. In this manner the point of emission of laser 5 is rotated cyclically about point 10.

Other control signals may be provided which cause the area of emission of laser 5 to spread wider than a single point such as point 15. This may be done, for example, by causing the critical angles of incidence of both surfaces 7 and 8 to be equal to 44°. This would produce a tolerance of two degrees (44° through 46°) within which rays are reflected by both surfaces 7 and 8.

One of the members 33 and 34 may be eliminated entirely if the application of the present invention requires that the width of the area of emission be changed rather than the direction of a narrow beam.

While piezoelectric crystals 40 and 41 are employed to mechanically adjust the gaps 36 and 37, other techniques may be employed to adjust the critical angle of incidence for surfaces 7 and 8. For example certain materials exhibit a change in index of refraction when placed in a field. In this modification members 33 and 34 may be composed of such a material and a field placed thereacross to adjust the critical angle of incidence.

While the surface 9 of laser 5 is illustrated to be circular in the drawing, other shapes may be employed with a corresponding adjustment in the shape of mirror 17. For example, the surface 9 may be composed of a series of flat surfaces, and mirror 17 formed with corresponding parallel flat surfaces as shown in above co-pending application Ser. No. 378,220. In this embodiment discrete resonant paths are set up which may be selected by frustrating the internal reflection at the laser surfaces.

In accordance with another aspect of the present invention the control of the cavity shown in the drawing may be accomplished with a Kerr cell or other optical device, such as those shown in the above-co-pending applications. For this modification surfaces 7 and 8 may be coated with a reflecting material so that all rays within the laser 5 are reflected.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for controlling the area of emission of laser light, comprising:
an angularly degenerate laser cavity including,
an active laser element shaped in the form of a lens having two flat perpendicular surfaces, and a rounded portion centered on the intersection of said flat surfaces, said lens shaped laser having a conjugate surface concentric with said rounded portion upon which light internally reflected from said flat surfaces is focused, and
a mirror located in said conjugate surface; and
control means located adjacent to at least one of said flat surfaces for frustrating the internal reflection of laser light striking said one surface at less than a critical angle of incidence to limit emission of laser light to an area where the angle of incidence is greater than said critical angle.

2. Apparatus as defined in claim 1 wherein said control means includes a transparent member, and means to vary the separation between said member and said one surface to produce a corresponding variation in said critical angle.

3. Apparatus for controlling the direction of emission of laser light, comprising:
an angularly degenerate laser cavity including,
an active laser element shaped in the form of a lens having two flat perpendicular surfaces, and a rounded portion centered on the intersection of said flat surfaces, said lens shaped laser having a conjugate surface concentric with said rounded portion upon which light internally reflected from said flat surfaces is focused, and
a mirror located in said conjugate surface; and
a pair of control means each one located adjacent to a different one of said flat surfaces for frustrating the internal reflection of laser light striking the adjacent flat surface at an angle less than a certain critical angle of incidence to limit emission of laser light striking the adjacent flat surface at an angle less than a certain critical angle of incidence to limit emission of laser light to a narrow area where the angle of incidence on each of said flat surfaces is greater than the corresponding critical angle.

4. Apparatus as defined in claim 3 wherein said pair of control means each includes a transparent member located adjacent to one of said flat surfaces, and separation means for varying the gap between the member and the adjacent flat surface.

5. Apparatus as defined in claim 4 wherein each of said separation means operates 180° out of phase varying the size of the pair of gaps in an alternate manner to rotate said narrow area of laser emission about the intersection of said flat surfaces.

References Cited

UNITED STATES PATENTS

| | | | |
|---|---|---|---|
| 3,308,395 | 3/1967 | Sorokin | 331—94.5 |
| 3,344,365 | 9/1967 | Lewis | 331—94.5 |

RONALD L. WIBERT, Primary Examiner

E. BAUER, Assistant Examiner

U.S. Cl. X.R.

350—285

PO-1050
(5/69)

UNITED STATES PATENT OFFICE
CERTIFICATE OF CORRECTION

Patent No. 3,458,829        Dated July 29, 1969

Inventor(s) Robert V. Pole and Euval S. Barrekette

It is certified that error appears in the above-identified patent and that said Letters Patent are hereby corrected as shown below:

Column 6, claim 3, line 24    delete "striking the adjacent flat surface at an angle"
                line 25    delete "less than a certain critical angle of incidence to limit"
                line 26    delete "emission of laser light".

SIGNED AND
SEALED
MAY 12 1970

(SEAL)
Attest:

Edward M. Fletcher, Jr.
Attesting Officer

WILLIAM E. SCHUYLER, JR.
Commissioner of Patents